United States Patent [19]

Kamio et al.

[11] Patent Number: 4,661,191
[45] Date of Patent: Apr. 28, 1987

[54] METHOD FOR BONDING A COLOR SEPARATION FILTER

[75] Inventors: Masaru Kamio, Kawaguchi; Shigeharu Iijima; Satoshi Yoshihara, both of Kawasaki; Yasutsugu Ogura, Tokyo, all of Japan

[73] Assignee: Canon Kabushiki Kaisha, Tokyo, Japan

[21] Appl. No.: 771,179

[22] Filed: Sep. 3, 1985

Related U.S. Application Data

[63] Continuation of Ser. No. 541,070, Oct. 12, 1983, abandoned.

[30] Foreign Application Priority Data

Oct. 20, 1982 [JP] Japan .................................. 57-183993
Oct. 20, 1982 [JP] Japan .................................. 57-183994

[51] Int. Cl.4 ............................................ B32B 31/26
[52] U.S. Cl. ............................... 156/275.5; 156/275.9; 156/299; 156/307.1; 358/43; 358/44
[58] Field of Search ............... 156/272.2, 275.1, 275.3, 156/275.5, 275.7, 297, 299, 307.1, 307.7, 308.4, 300; 358/43–44

[56] References Cited

U.S. PATENT DOCUMENTS

| | | | |
|---|---|---|---|
| 4,044,187 | 8/1977 | Kremkau ........................... | 156/272.2 |
| 4,222,635 | 9/1980 | Jülke .................................. | 156/275.5 |
| 4,388,128 | 6/1983 | Ogawa et al. ..................... | 156/275.1 |
| 4,418,284 | 11/1983 | Ogawa et al. ..................... | 156/275.7 |

Primary Examiner—Donald E. Czaja
Assistant Examiner—Merrell C. Cashion, Jr.
Attorney, Agent, or Firm—Fitzpatrick, Cella, Harper & Scinto

[57] ABSTRACT

A method for bonding of a color separation filter comprises placing a color separation filter through an intermediary UV-ray curable type bonding agent on a solid state image pick-up device, effecting registration between the solid state image pick-up device and the color separation filter, then applying irradiation of UV-ray at a luminous intensity of 30 mW/cm$^2$ or higher from the side of the color separation filter thereby to subject said bonding agent to partial curing, and thereafter applying UV-ray irradiation at a luminous intensity of 5 mW/cm$^2$ or lower from the side of the color separation filter thereby to subject said bonding agent to full curing.

4 Claims, 5 Drawing Figures

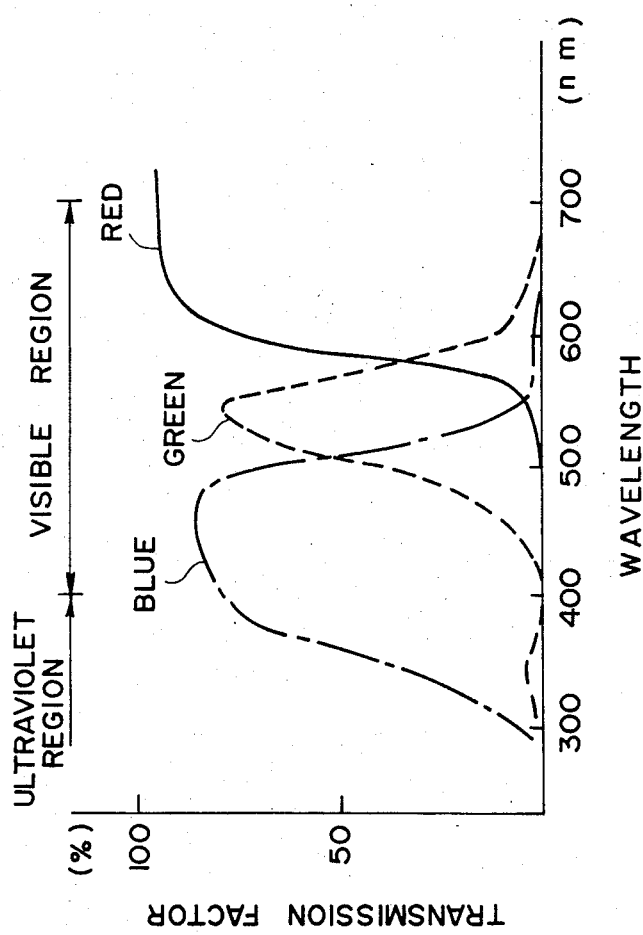
F I G. 1

METHOD FOR BONDING A COLOR SEPARATION FILTER

This is a continuation of application Ser. No. 541,070, filed Oct. 12, 1983 now abandoned.

BACKGROUND OF THE INVENTION

1. Field of the Invention

This invention relates to a method for bonding a color separation filter. More particularly, it relates to a method for bonding a color separation filter to a solid state image pick-up device.

2. Description of the Prior Art

A color filter of color separability has been used more frequently than ever together with a solid state image pick-up device which is used in place of the camera tube of the prior art as an element for converting two-dimensional image to the electrical signals, particularly in recent years with the progress in semiconductor production techniques. For example, a solid state image pick-up device called under the name of CCD (charge coupled device), MOS (metal oxide semiconductor) or BBD (bucket brigade device) houses a number of minutely divided imaging areas and driving circuits for taking out information from these imaging areas in one chip, and a color camera employing a solid state image pick-up device takes out color signals by means of color separation filters such as respective filter elements of red, green and blue which are arranged in the shape of a mosaic or stripes so as to confront the respective picture elements of a solid state image pick-up device such as CCD, MOS and BBD. At present, most of the color separation filters are generally bonded to the substrate of the imaging elements as mentioned above or display elements.

As the resin to be used for such bonding, a thermosetting type resin or UV-ray curable type resin may be used. However, in the case of bonding between a solid state image pick-up device and a color separation filter, it is necessary to realize a bonding agent thickness of 10 μm or less and an alignment precision of about 1 μm. When bonding is to be effected with such a precision, a thermosetting type resin, which undergoes curing gradually, cannot give good alignment precision. Further, productivity is worsened when the curing time is longer.

On the other hand, in the case of a UV-ray curable type bonding agent, by use of an aligner device, it is possible to effect registration between, for example, the picture element portion of solid state image pick-up device and the color separation filter with good precision, and by irradiation of UVray immediately after completion of registration, the bonding agent can be cured within a short period of time.

Also, when a UV-ray curable bonding agent is employed, for the purpose of effective utilization of an aligner device, partial curing of the bonding agent may be effected for a short time after setting the solid state image pick-up device and color separation filter on the aligner device, followed by full curing for a long time after dismantling from the aligner device, as proposed in Japanese Laid-open Patent Publication No. 2674/1981. However, there are also involved problems in UV-ray curable type bonding agents. That is, even in the region in which a stripe or mosaic pattern of color separation filters is formed, the transmission factor of UV-ray differs depending on the color of the filters as shown in FIG. 1, whereby it takes a long time until the bonding agent on the color separation filter as a whole is cured. Accordingly, if it is desired to shorten the curing time, the intensity of irradiation of UV-ray may be increased. Such an increase of intensity, however, will give rise to the problems of deterioration of dyes in the color separation filters. Besides, if the irradiation intensity of UV-ray is increased, since the UV-ray transmission factor at the blue filter element portion of the color separation filter is by far greater than that at the red or green filter element portion, strong UV-ray will be transmitted through the filter to harden abruptly the bonding agent beneath the blue filter element portion. As the result, volume shrinkage of the bonding agent accompaning with the curing will also occur abruptly, whereby uncured bonding agent surrounding the cured bonding agent will flow into the abruptly cured bonding agent to reduce the amount of the surrounding bonding agent. Consequently, when curing of the surrounding bonding agent has been completed, its thickness becomes smaller than that beneath the blue filter element portion to give rise to the problem that air corresponding to the reduction in thickness is included. Inclusion of the air will result in extreme lowering of color separation capacity at said portion.

SUMMARY OF THE INVENTION

Accordingly, an object of the present invention is to provide a method for bonding of a color separation filter which is free from deterioration of dyes of the color separation filter by UV-ray.

It is also another object of the present invention to provide a method for bonding of a color separation filter which is free from inclusion of the air.

Still another object of the present invention is to provide a method for bonding of a color separation filter firmly through curing of the whole bonding agent layer.

According to the present invention, there is provided a method for bonding of a color separation filter which comprises placing a color separation filter through an intermediary UV-ray curable type bonding agent on a solid state image pick-up device, effecting registration between the solid state image pick-up device and the color separation filter, then applying irradiation of UV-ray at a luminous intensity of 30 mW/cm² or higher from the side of the color separation filter thereby to subject said bonding agent to provisional curing, and thereafter applying UV-ray irradiation at a luminous intensity of 5 mW/cm² or lower from the side of the color separation filter thereby to subject said bonding agent to full curing.

BRIEF DESCRIPTION OF THE DRAWINGS

FIG. 1 is a graph showing the spectral transmission factors of the respective colors through the color separation filter;

DETAILED DESCRIPTION OF THE PREFERRED EMBODIMENTS

Figure 2:
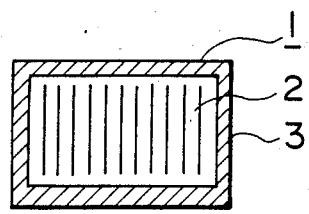
FIG. 2 is a plane view of the color separation filter employed in the Examples.

According to the present invention, after registration between a solid state image pick-up device and color separation filter through an intermediary UV-ray curable type bonding agent, provisional bonding is effected between the solid state image pick-up device and the color separation filter by irradiation of UV-ray at a high luminous intensity, whereby irradiation time at a high intensity can be shortened to avoid deterioration of the color separation filter. The full curing following such a partial curing is conducted by irradiation of UV-ray at a low luminous intensity for a long time, and therefore it is possible to carry out the full curing of the bonding agent without causing any deterioration of the color separation filter. Moreover, although partial curing is effected by irradiation of UV-ray at a high luminous intensity, irradiation is discontinued before complete curing of the bonding agent and therefore no such phenomenon of inclusion of the air as described above will occur. Also, in the full curing which is conducted by irradiation of UV-ray at a low luminous intensity, curing of the bonding agent will proceed slowly and therefore the difference in curing shrinkage of the bonding agent due to the difference in transmission factor of UV-ray between the color filter elements of the color separation filter becomes smaller to cause no such phenomenon of inclusion of the air as described above. Besides, when there is a light-intercepting region on the peripheral portion of the color separation filter provided for the purpose of generating no noise in the transfer area of the solid state image pick-up device, there is a fear that uncured portion due to absence of irradiation of UV-ray may remain beneath said light-intercepting region. This problem can be overcome, however, by restricting the width of the light-intercepting region to 1.5 mm or less, which enables sufficient curing of the bonding agent beneath the light-intercepting region on the peripheral portion of the color separation filter by prolonged irradiation of UV-ray of low luminous intensity and also curing of the bonding agent beneath the light-intercepting region without deterioration of the dyes of color separation filter.

Referring now to the procedure of the bonding method, by use of a laminating device modified from a mask aligner device, the filter face of a color separation filter is set so as to face the image pick-up face of a solid state image pick-up device. Then, a UV-ray curable type bonding agent is added dropwise onto the solid state image pick-up device, and registration between the color separation filter and the solid state image pick-up device is conducted to have them closely contacted with each other. Under the closely contacted state as such, UV-ray is irradiated to effect partial curing of the bonding agent. With such an operation, the solid state image pick-up device is provisionally fixed to the color separation filter. The luminous intensity of UV-ray irradiation during this operation may be preferably 30 mW/cm$^2$ or higher, particularly 35 mW/cm$^2$ or higher, and the irradiation time may be short, generally within one minute, preferably within 15 seconds, whereby no deterioration of the dye of color separation filter occurs. Further, the luminous intensity does not desirably exceed 100 mW/cm$^2$.

After completion of the partial curing, the solid state image pick-up device adhered with the color separation filter is taken out from the laminating device and placed in a full curing device wherein full curing is performed. As the light source to be used for full curing, there may be employed a low pressure mercury vapor lamp, a high pressure mercury vapor lamp, a super high pressure mercury vapor lamp, a fluorescent tube for photopolymerization, a high pressure xenon lamp and the like, and the irradiation may be applied for a long time, generally 30 minutes or longer, under UV-ray luminous intensity of preferably 5 mW/cm$^2$ or lower, more preferably 3 mW/cm$^2$ or lower.

By this operation, the bonding agent can be completely cured without causing deterioration of the dye of color separation filter, and no uncured portion remains in the bonding agent beneath the lightintercepting region.

As the UV-ray curable type of the bonding agent to be used in the present invention, there may be employed various commercially available bonding agents. Particularly, it is suitable to use acrylic resin type bonding agents such as of oligoacrylate, epoxy acrylate, urethane acrylate and the like. As the commercially available acrylic resin type bonding agents, there may suitably be employed PHOTOBOND 100, PHOTOBOND 300 and PHOTOBOND 500 produced by MEISEI CHARCHIL Co., LOCTTITE 350, LOCTTITE 354 and LOCTTITE 358 produced by NIPPON LOCTTITE, and SONY BOND 17A18 produced by SONY CHEMICAL Co.

The method of the present invention is capable of bonding a color separation filter to a solid state image pick-up element with good efficiency and high precision by effecting registration between a color separation filter and a solid state image pick-up device through an intermediary UV-ray curable type bonding agent, irradiating strongly UV-ray on the bonded assembly and then irradiating weakly UV-ray thereon.

EXAMPLE 1

Figure 3:
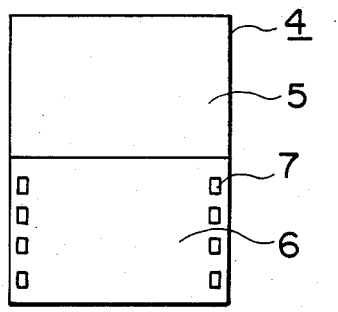
FIG. 3 is a plane view of the solid state image pick-up device employed in Examples.

FIG. 2 shows a color separation filter comprising stripe-shaped filter elements of blue, green and red employed in this Example, and FIG. 3 shows a CCD solid state image pick-up device. On the peripheral portion of the color separation filter 1, there is formed a light-intercepting region 3 with 1.5 mm width of chromium, and the stripe-shaped pattern 2 is formed in the area surrounded by the light-intercepting region 3. The solid state image pick-up device 4 has an imaging area 5 and a storage area 6, and it is a frame transfer charge coupled device equipped with a pad 7 for bonding.

Figure 4:
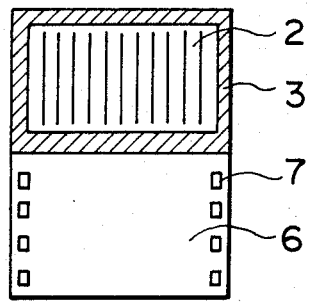
FIG. 4 is a plane view of the state in which the color separation filter is laminated onto the solid state image pick-up device.
Figure 5:
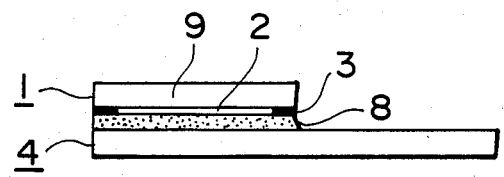
FIG. 5 is a sectional view of the state in which the color separation filter is laminated onto the solid state image pick-up device.

FIG. 4 and FIG. 5 show the state when the color separation filter 1 is bonded to the solid state image pick-up device 4.

By use of the laminating device modified from a mask aligner, on the member for lamination of the laminating device, the imaging area 5 of the solid state image pick-up device 4 and the stripe pattern 2 on the glass substrate 9 of the color separation filter 1 were set face to face. Then, to the center of the imaging area 5 of the solid state image pick-up device 4, a UV-ray curable type bonding agent 8 (LOCTTITE 354) was added dropwise in an amount of 0.1 to 0.2 cc by means of a dispenser. Thereafter, the solid state image pick-up device 4 and the color separation filter 1 were approximated to 20 μm, whereat registration between both was effected. After completion of registration, the solid state image pick-up device 4 and the color separation filter 1 were pressured bonded to a bonding agent thickness of 10 μm or less. Under this state, from the side of the color separation filter 1, UV-ray irradiation was applied for 4 seconds on the entire face by a built-in super high pressure mercury vapor lamp (UV-ray luminous intensity of 40 mW/cm$^2$) in the laminating device. By this operation, provisional fixing of the color separation filter 1 to the solid state image pick-up device 4 was completed. There was observed no change in respective spectral characteristics of the respective colors in the color separation filter 1 by the UV-ray irradiation during this operation.

Then, the solid state image pick-up device 4 provisionally attached to the color separation filter 1 was taken out from the laminating device, and set in a full curing device with the color separation filter facing toward the light source. As the light source, a fluorescent tube for photopolymerization (produced by Toshiba Co.) was employed, with a luminous intensity being 2 mW/cm$^2$ UV-ray was irradiated in this full curing device for 60 minutes. Thus, full curing of the bonding agent was completed.

After completion of the full curing, the spectral characteristics of the respective colors of the color separation filter 1 were measured to show no change at all. Also, for examination of the bonding agent 8 beneath the light-intercepting region of chromium provided on the color separation filter 1 whether it was completely cured or not, the color separation filter 1 was peeled off from the solid state image pick-up device 4, whereby it was found that there remained no uncured portion in the bonding agent 8, indicating that it was completely cured.

COMPARATIVE EXAMPLE 1

In Example 1, provisional curing was effected by irradiation of UV-ray at an intensity of 20 mW/cm$^2$ for 10 seconds. Then, the color separation filter was taken out from the laminating device and the precision of registration between the color separation filter and the solid state image pick-up device was observed by a microscope (×200). As the result, a positional deviation of about 5 μm was found to be formed. For avoiding such a positional deviation, the UV-ray irradiation time was required to be continued for 5 minutes.

COMPARATIVE EXAMPLE 2

In Example 1, the full curing was carried out by irradiating UV-ray at an intensity of 20 mW/cm$^2$ for 60 minutes to cure the UV-ray curable bonding agent. As the result, deterioration of the dye at the stripe pattern portion of the color separation filter occurred to lower the peak transmission factor of the respective colors by 10% or more. Also, air bubbles due to curing distortion of the bonding agent were generated to markedly lower the resolution of the solid state image pick-up device.

COMPARATIVE EXAMPLE 3

In Example 1, color separation filters having the light-intercepting regions of chromium with widths of 1.0 mm, 1.7 mm, 2.0 mm and 2.5 mm provided on the peripheral portions of the filters were prepared, and samples laminated with the solid state image pick-up devices were prepared according to the same procedure as described in Example 1. The cured states beneath the chromium light-intercepting regions of the respective filters laminated under these conditions are shown in Table 1.

TABLE 1

| Width of light-intercepting region of chromium, (mm) | 1.0 | 1.5* | 1.7 | 2.0 | 2.5 |
|---|---|---|---|---|---|
| Cured state | Whole region cured | Whole region cured | Partial curing seen, with increased viscosity at other portions | Partial curing seen | Partial curing seen |

Note: *Example 1

As shown in Table 1, when the width of light-intercepting region was 1.7 mm or more, uncured portion remained in the bonding agent. When these samples were subjected to a reliability test under the conditions of 85° C., 85% and 500 hours, peel-off occurred at the uncured portion, and this peeling of the filter extended to the imaging area to have bad influences on the image pick-up characteristics. However, for the solid state image pick-up devices laminated with the color separation filters having the light-intercepting regions with widths of 1.5 mm or less, no generation of peel-off occurred in the reliability test under the conditions of 85° C., 85% and 500 hours to give no change in the image pick-up characteristics.

EXAMPLE 2

By means of a laminating device modified from a mask aligner, the imaging area 5 of the solid state image pick-up device 4 and the stripe pattern 2 on the glass substrate 9 of the color separation filter 1 were set face to face on the laminating member in the laminating device. The filter 1 had a lightintercepting region of chromium with 1.5 mm width at the peripheral portion. Then, to the center of the imaging area 5 of the solid state image pick-up device 4 was added dropwise 0.1 to 0.2 cc of a UV-ray curable type bonding agent 8 (PHOTOBOND 300) by means of a dispenser. As the next step, under observation by a binocular microscope (×280) in the laminating device, the solid state image pick-up device 4 and the color separation filter 1 were pressure bonded to each other until their patterns entered the same focus to effect registration therebetween. At this point, the thickness of the bonding agent became 10 μm or less. Under this state, from the side of the color separation filter 1, UV-ray irradiation was applied for 8 seconds on the entire face by a built-in super high pressure mercury vapor lamp (UV-ray luminous intensity of 50 mW/cm$^2$) in the laminating device. By this operation, provisional fixing of the color separation filter 1 to the solid state image pick-up device 4 was completed. There was observed no change in respective spectral characteristics of the respective colors in the color separation filter 1 by the UV-ray irradiation during this operation.

Then, the solid state image pick-up device 4 provisionally attached to the color separation filter 1 was taken out from the laminating device, and set in a full curing device with the color separation filter facing toward the light source. As the light source, a fluorescent tube for photopolymerization (produced by Toshiba Co.) was employed, with a luminous intensity being 3 mW/cm$^2$ UV-ray was irradiated in this full curing device for 50 minutes. Thus, full curing of the bonding agent was completed.

After completion of the full curing, the spectral characteristics of the respective colors of the color separation filter 1 were measured to show no change at all. Also, for examination of the bonding agent 8 beneath the light-intercepting region of chromium provided on the color separation filter 1 whether it was completely cured or not, the color separation filter 1 was peeled off from the solid state image pick-up device 4, whereby it was found that there remained no uncured portion in the bonding agent 8, indicating that it was completely cured.

COMPARATIVE EXAMPLE 4

In Example 2, provisional curing was effected by irradiation of UV-ray at an intensity of 20 mW/cm$^2$ for 20 seconds. Then, the color separation filter was taken out from the laminating device and the precision of registration between the color separation filter and the solid state image pick-up device was observed by a microscope (×200). As the result, a positional deviation of about 3 μm was found to be formed. For avoiding such a positional deviation, the UV-ray irradiation time was required to be continued for 6 minutes.

COMPARATIVE EXAMPLE 5

In Example 2, full curing was carried out by irradiating UV-ray at an intensity of 20 mW/cm$^2$ for 70 minutes to cure the UV-ray curable bonding agent. As the result, deterioration of the dye at the stripe pattern portion of the color separation filter occurred to lower the peak transmission factor of the respective colors by 12% or more. Also, air bubbles due to curing distortion of the bonding agent were generated to markedly lower the resolution of the solid state image pick-up device.

COMPARATIVE EXAMPLE 6

In Example 2, color separation filters with the light-intercepting region of chromium having widths of 1.0 mm, 1.7 mm, 2.0 mm and 2.5 mm provided on the peripheral portion of the filters were prepared, and samples laminated with the solid state image pick-up devices were prepared according to the same procedure as described in Example 2. The cured states beneath the light-intercepting regions of chromium of the respective filters laminated under these conditions are shown in Table 2.

TABLE 2

| Width of light-intercepting region, (mm) | 1.0 | 1.5* | 1.7 | 2.0 | 2.5 |
| --- | --- | --- | --- | --- | --- |
| Cured state | Whole region cured | Whole region cured | Partial curing seen, with increased viscosity at other portions | Partial curing seen | Partial curing seen |

Note: *Example 2

As shown in Table 2, when the width of light-intercepting region was 1.7 mm or more, uncured portion remained in the bonding agent. When these samples were subjected to a reliability test under the conditions of 85° C., 85% and 500 hours, peel-off occurred at the uncured portion, and this peeling of the filter extended to the imaging area to have bad influences on the image pick-up characteristics. However, for the solid state image pick-up devices laminated with the color separation filters having the light-intercepting regions of widths of 1.5 mm or less, no generation of peel-off occurred in the reliability test under the condition of 85° C., 85% and 500 hours to give no change in the image pick-up characteristics.

EXAMPLE 3

As the color separation filter, the cyan, yellow and magenta stripe filter elements were employed, and by means of a laminating device modified from a mask aligner, the imaging area 5 of the solid stage image pick-up device 4 and the stripe pattern 2 on the substrate 9 of the color separation filter 1 were set face to face on the laminating member in the laminating device. The filter had a light-intercepting region of chromium with 1.5 mm width on the peripheral portion. Then, to the center of the imaging area 5 of the solid state image pick-up device 4 was added dropwise 0.1 to 0.2 cc of a UV-ray curable type bonding agent 8 (trade name: SONY BOND 17A18, produced by SONY CHEMICAL CO.) by means of a dispenser. As the next step, under observation by a binocular microscope (×280) in the laminating device, the solid state image pick-up device 4 and the color separation filter 1 were pressure bonded to each other until their patterns entered the same focus to effect registration therebetween. At this point, the thickness of the bonding agent became 10 μm or less. Under this state, from the side of the color separation filter 1, UV-ray irradiation was applied for 3 seconds on the entire face by a built-in super high pressure mercury vapor lamp (UV-ray luminous intensity of 45 mW/cm$^2$) in the laminating device. By this operation, provisional fixing of the color separation filter 1 to the solid state image pick-up device 4 was completed. There was observed no change in respective spectral characteristics of the respective colors in the color separation filter 1 by the UV-ray irradiation during this operation.

Then, the solid state image pick-up device 4 provisionally attached to the color separation filter 1 was taken out from the laminating device, and set in a full curing device with the color separation filter facing toward the light source. As the light source, a fluorescent tube for photopolymerization (produced by Toshiba Co.) was employed, with a luminous intensity being 2 mW/cm$^2$. UV-ray was irradiated in this full curing device for 50 minutes. Thus, full curing of the bonding agent was completed.

After completion of full curing, the spectral characteristics of the respective colors of the color separation filter 1 were measured to show no change at all. Also, for examination of the bonding agent 8 beneath the light-intercepting region of chromium provided on the color separation filter 1 whether it was completely cured or not, the color separation filter 1 was peeled off from the solid state image pick-up device 4, whereby it was found that there remained no uncured portion in the bonding agent 8, indicating that it was completely cured.

As described above, by use of the bonding method according to the present invention, registration between the imaging area of the solid state image pickup device and the color separation filter can be effected with good precision, and bonding without deterioration of the dye of the color separation filter can also be done.

What we claim is:

1. A method for bonding a color separation filter which comprises placing a color separation filter through an intermediary UV-ray curable type bonding agent on a solid state image pick-up device, effecting registration between the solid state image pick-up device and the color separation filter, then applying irradiation of UV-radiation at a luminous intensity of 30 mW/cm$^2$ or higher from the side of the color separation filter for a period of time of such duration that the bonding agent under a blue portion of the color separation filter is not fully cured, thereby to subject said bonding agent to partial curing, and thereafter applying UV-radiation at a luminous intensity of 5 mW/cm$^2$ or lower from the side of the color separation filter for a period of time sufficient to complete full curing of the bonding agent, thereby to subject the bonding agent to full curing.

2. A method for bonding a color separation filter according to claim 1, wherein the UV-ray irradiation for the provisional curing is applied for not more than one minute.

3. A method for bonding a color separation filter according to claim 1, wherein the UV-ray irradiation for the full curing is applied for 30 minutes or longer.

4. A method for bonding a color separation filter according to claim 1, wherein there is formed a light-intercepting region on the peripheral portion of the color separation filter which is 1.5 mm or less in width.

* * * * *